Sept. 9, 1941.  W. R. BROWN  2,255,647
CONVERTIBLE SEAT
Filed May 21, 1940
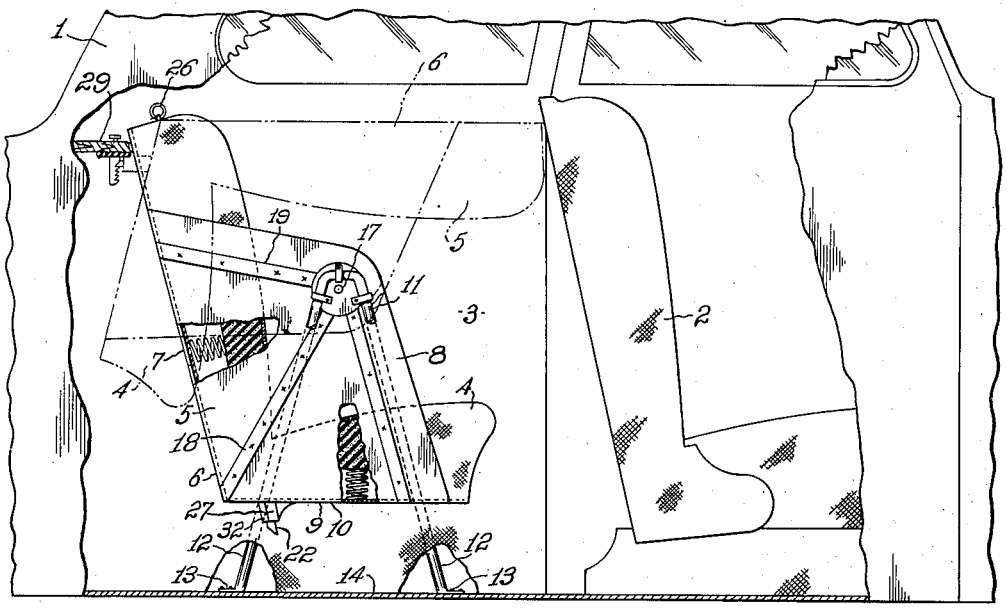
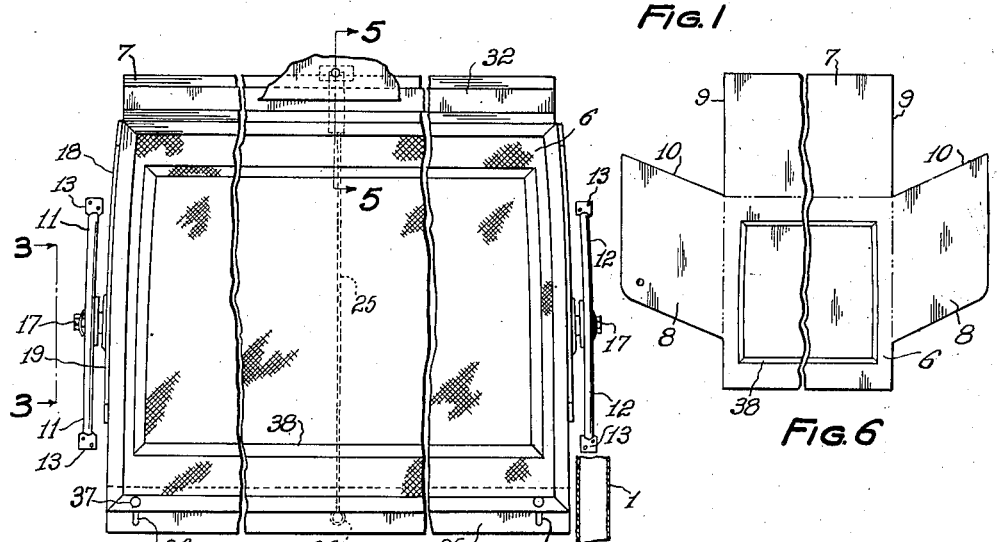
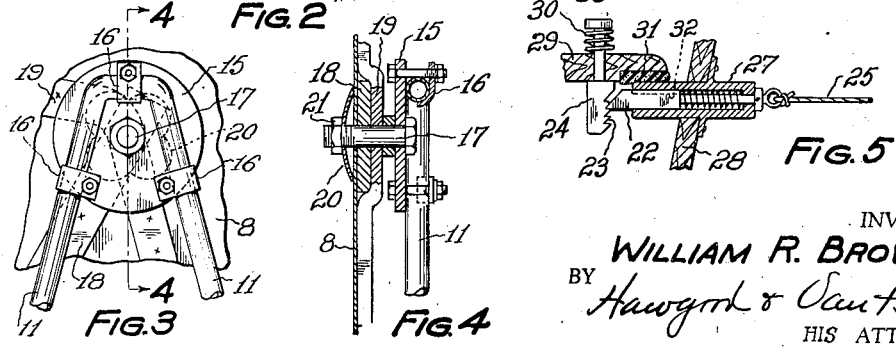
INVENTOR.
WILLIAM R. BROWN
BY Haworth & Van Horn
HIS ATTORNEYS Patented Sept. 9, 1941

2,255,647

UNITED STATES PATENT OFFICE 2,255,647

CONVERTIBLE SEAT

William R. Brown, Cleveland, Ohio

Application May 21, 1940, Serial No. 336,391

3 Claims. (Cl. 155—5)

My invention relates to vehicle seats and more specifically is an improvement in vehicle seats of the convertible type.

It is well known that in certain types of vehicle bodies providing primarily for comfortable seating for only the driver and one passenger, there is usually a storage space behind the seat. Sometimes this storage space is provided with a shelf extending to the rear of the car body, thus eliminating the space below from useful purpose, or requiring it to be used as part of a rumble seat or trunk compartment.

Then again this space may be entirely walled off for storage use accessible from within the driving compartment of the body.

It has been common to install "theatre" chairs or other types of folding seats in this space for additional passengers, but such arrangements have always resulted in uncomfortable and cramped seating.

A recent development in motor car design has incorporated the principles of stream lining with the result that the body has been lengthened. In the type of body above referred to, such as the business coupe, such streamlining has provided additional useful space behind the driver's seat.

It is, therefore, one of the objects of my invention to utilize such space in the most economical manner by providing a convertible means which may be used either as a seat or as an article support or shelf.

Another object of the invention resides in providing a convertible seat which in one position may be used as a seat or it may be converted into a support by rotating it about a substantially horizontal axis.

A further object of my invention is to provide a convertible seat of the type defined which is of simple design, low in cost of manufacture, and which can be easily installed.

A still further object is to provide locking means to retain the device in an article supporting position with release means whereby the seat may be rotated to its normal position as a seat, the center of gravity of the seat being sufficiently below the turning axis that the seat will normally tend to seek the seating position.

Another object of the invention is to provide a convertible auxiliary seat in the space behind the driver's seat in a coupe body and to rotatably support and position the seat in such a manner that maximum riding comfort will be assured and maximum storage or article carrying surface will be afforded when the seat is in converted position.

Other objects and advantages of my invention will become more apparent as the following description of an embodiment thereof progresses, reference being made to the accompanying drawing in which like reference characters are employed to designate like parts throughout the same.

In the drawing:

Figure 1 is a side elevation showing an embodiment of my invention in use. The seat is shown in its normal seating position in solid lines, while the article supporting position is indicated in dotted lines;

Figure 2 is a top plan view of the seat in converted position;

Figure 3 is an enlarged fragment taken in the direction of line 3—3 of Figure 2, and shows in detail the rotatable support for the seat;

Figure 4 is a section taken on line 4—4 of Figure 3;

Figure 5 is a section taken on line 5—5 of Figure 2 and illustrates the latch and release; and Figure 6 is a layout of the seat blank.

Referring now more in detail to the embodiment of my invention illustrated in the accompanying drawing, a car body is indicated at 1, there being provided the usual driver's seat 2.

In accordance with my invention the space 3 behind the driver's seat is utilized by providing a seat convertible into an article support by rotatably mounting the same in the body.

The convertible seat is shown generally at 4 and comprises the seat and a back portion 5. A simplified form of seat construction is shown in Figure 6 wherein I have illustrated a seat blank stamped from sheet metal comprising the back wall 6, the seat wall 7, and oppositely disposed web or side members 8. This blank may be formed in a single operation and therefore constitutes a simple and inexpensive method of manufacture. When the blank is folded to form the seat or chair, the corresponding edges 9 and 10 may be welded together as shown in Figure 1.

The seat is supported above the car floor upon a pair of supports 11 and 12 which are preferably formed of tubular metal shaped in the form of an inverted V shown more in detail in Figures 3 and 4. The bases 13 of the supports may be welded or otherwise secured to the floor or chassis 14.

Suitable bearings are provided to rotatably support the seat within the space 3. In the embodiment shown these bearings are carried by the supports 11 and 12 respectively, and each comprises a plate or disc 15 rigidly clamped to the upper part of the supports 11 or 12 by means of the clamps 16. The plate or disc is apertured to receive a spindle bolt 17 which passes inwardly through the reinforcing members 18 and 19 and the side walls or webs 8 of the seat blank. Clover leaf washers 20 which are of cupped cross section are provided and the entire unit is maintained in assembled position by means of the nut 21 threaded on to the protruding end of the bolt 17.

It will be noted that the axis of rotation or swing of the seat is located above the center of gravity of the seat so that the seat will have a normal tendency to assume the seating position. It will also be seen that the seat can readily be swung to the dotted line position in Figure 1 so that the seat back will serve as an article support.

I have provided latch means shown in detail in Figure 5 for releasably securing the seat in its dotted line position, which consists of a spring pressed plunger 22 having an inclined and pointed end engageable in a series of teeth or notches 23 in the adjustable stop member 24. A cable 25 is attached at one end to the plunger and passes through or along the seat back 5 and terminates at the top thereof in a finger loop 26.

By this means the user may release the bolt or latch 22 from engagement with the notches 23 and be thereby enabled to rotate the seat to full line position in Figure 1.

The bolt 22 operates in a casing 27 carried by and projecting below the seat base as at 28, while the member 24 is carried by and projects downwardly from the ledge or shelf 29. The member 24 is normally urged upwardly by the compression of spring 30 to securely hold the bolt in engagement with one of the notches 23. In order to reduce and eliminate the possibility of rattling due to vibration I provide a rubber gasket 31 secured to the under side of the shelf 29 and extending the length thereof. This gasket is engageable with the housing 27 and the flange 32 extending laterally across the base of the seat.

As has been explained, the seat may easily be converted to an article support by merely rotating the seat on its bearings in a clockwise direction in Figure 1 from the full line to the dotted line position.

As an article support it will be seen that the seat back wall 6 substantially bridges the space between the ledge 29 and the back of front seat 2 and in such position is disposed in a substantially horizontal plane. As is usually the case, the front seat 2 is adjustable forward and backward to afford added riding and driving comfort to the driver. In order that the convertible seat back 6 will entirely bridge the space back of the driver's seat, I provide an adjustable plate 35 extending across the entire width of the seat back along its upper end and slidable within the back.

This plate is provided with elongated guide slots 36 through which project the pins 37. With this plate the seat back may be extended in effect to the back of the front seat regardless of the adjustment of the front seat.

The supporting wall of the seat back is preferably depressed at 38 around its borders to provide a peripheral guard against articles rolling off the support.

Of course, the seat 4 and back rest 5 are upholstered in any desirable manner, and the article supporting surface of the seat back may be covered with fabric or other material as indicated, thus producing a neat and finished surface when the back is up. As shown in Figure 2, the supports 11 and 12 are preferably located between the inner and outer walls of the body 1.

Various changes may be made in the details of construction or arrangement of parts without departing from the spirit of the invention or the scope of the appended claims.

I claim:

1. In a motor vehicle body, a seat and back rest rigidly assembled together and movable as a unit about a horizontal axis located above the seat portion, a pair of spaced supports in the body for movably supporting the unit, aligned bearing members in said supports, said back rest portion constituting an article support in one extreme limit of movement of the unit, and releasable means for maintaining the unit in said extreme limit of movement, means comprising a plurality of members secured to each side of said unit and converging at their outer ends toward the axis on which the unit is supported, and aligned bearing members in said converging outer ends for engagement with the respective bearing members on the supports.

2. The combination with a motor vehicle body and a front seat in said body, of a convertible member rotatably mounted in said body for rotation about a substantially horizontal axis, said convertible member comprising an integral seat and back rest, aligned bearing members carried by the convertible member, a pair of supports in said vehicle body, bearing members in said supports for engagement with said other bearing members whereby to rotatably support the convertible member in the body, the back rest portion of said member bridging a space between the said front seat and the rear wall of said body to provide a substantially continuous baggage support when the convertible member is swung from a seating position to a baggage supporting position on said bearings, and releasable means for maintaining said member in baggage supporting position.

3. In a motor vehicle body having a front seat and a rear body wall, a rear seat pivotally supported in the body between the said front seat and said rear wall, a pair of spaced supports for the seat in said body, cooperating bearing members carried by said supports and by said seat and engageable to permit said seat to be rotated, said seat having a back rest portion projecting upwardly therefrom and adapted to bridge the space between the front seat and the body rear wall when the seat is rotated on its axis in one direction, and means for releasably maintaining said back rest portion in said space bridging position to provide a baggage support in said body.

WILLIAM R. BROWN.